(12) United States Patent
Johnson

(10) Patent No.: US 10,540,016 B1
(45) Date of Patent: Jan. 21, 2020

(54) UNLIMITED REACH AND TOUCH TABLET

(71) Applicant: Jeffrey Thomas Johnson, Wilmington, NC (US)

(72) Inventor: Jeffrey Thomas Johnson, Wilmington, NC (US)

(73) Assignee: Jeffrey Thomas Johnson, Wilmington, NC (US)

( * ) Notice: Subject to any disclaimer, the term of this patent is extended or adjusted under 35 U.S.C. 154(b) by 0 days.

(21) Appl. No.: 16/164,575

(22) Filed: Oct. 18, 2018

Related U.S. Application Data

(60) Provisional application No. 62/763,307, filed on Jun. 8, 2018.

(51) Int. Cl.
  *G06F 3/02* (2006.01)
  *G06F 3/023* (2006.01)

(52) U.S. Cl.
  CPC ............ *G06F 3/0202* (2013.01); *G06F 3/023* (2013.01); *G06F 3/0227* (2013.01)

(58) Field of Classification Search
  CPC ...... G06F 3/0202; G06F 3/0227; G06F 3/023; G06F 3/02; G06F 3/044; G06F 3/041
  See application file for complete search history.

(56) References Cited

U.S. PATENT DOCUMENTS

| | | | | |
|---|---|---|---|---|
| 2010/0162109 | A1* | 6/2010 | Chatterjee | G06F 3/016 715/702 |
| 2012/0247934 | A1* | 10/2012 | Schmidt | H01H 19/11 200/336 |
| 2012/0260164 | A1* | 10/2012 | Scheufler | B60K 35/00 715/702 |
| 2016/0030835 | A1* | 2/2016 | Argiro | A63F 13/02 463/33 |
| 2018/0004305 | A1* | 1/2018 | Moseley | G06F 3/0414 |

* cited by examiner

Primary Examiner — Afroza Chowdhury

(57) ABSTRACT

The embodiment of an Unlimited Reach and Touch Tablet comprises a computer peripheral device with which two or more internet users may, through their respective Tablets and software application, physically connect by transmitting 3-dimensional hand impressions, made into each Tablet's surface button array, to form the hands' reciprocal shape on a remote receivers' Tablet button array (11) which raises when a remote user[s] press[es] their hands (29) into their Tablets' surface button array (11).

The Tablet is a device housing an array of polymer buttons (20) that comprises two polymer springs per button (26,28), a shape memory alloy spring per button (27), an electric switch per button (24), and two circuit boards (22,23) that react to, and signal up and down button movements made by each users' pressing the devices' surface button arrays.

With the Tablets' elements functioning together, this device creates a tool and medium for distant users of the Tablet, software application, and internet connection to remotely feel and share the idiosyncrasies of the human touch via the rise and fall of the tablets' surface array buttons FIG. 2, FIG. 3, and FIG. 4.

1 Claim, 6 Drawing Sheets

UNLIMITED REACH AND TOUCH TABLET

CROSS-REFERENCE TO RELATED APPLICATIONS

This application claims the benefit of an earlier submitted Provisional Patent Application 62/763,307, filed Jun. 8, 2018.

BACKGROUND OF THE INVENTION

In today's world there exists fast, free, easy, and convenient platforms for communication made possible by using software applications built for phones, tablets, and computers that make a media-rich society expecting sound, video, and camera content made to operate quickly and clearly; and, all the while, leaving a giant place open for a new platform to fill that which is missing: the communication of human touch.

An Unlimited Reach and Touch Tablet provides a tool and medium for distant users to communicate through touch using a Tablets' surface button array interface and software application; thereby, the use of the Unlimited Reach and Touch Tablet opens the world of human touch to the internet users' chatting, calling, and connecting community.

BRIEF SUMMARY OF THE INVENTION

An Unlimited Reach and Touch Tablet is a computer peripheral device with which two or more internet users may, through their respective Tablets and software application, physically connect by transmitting 3-dimensional hand impressions, made into the device's surface button array, to form the hand's reciprocal shape on a remote receiver's Tablet button array.

Said Unlimited Reach and Touch Tablet is a device housing an array of polymer buttons that comprises two polymer springs per button, a shape memory alloy spring per button, an electric switch per button, and two circuit boards that react to and signal up and down button movements made by each users' pressing the devices' surface button arrays.

With said Tablets' elements functioning together, this device creates a tool and medium for distant users of the Unlimited Reach and Touch Tablet, software application, and internet connection to remotely feel and share the idiosyncrasies of the human touch via the rise and fall of the Tablets' surface array buttons.

DRAWINGS-REFERENCE NUMERALS

| | | | |
|---|---|---|---|
| 11 | surface button array | 26 | spring number one |
| 12 | Unlimited Reach and Touch Tablet's case | 27 | spring number two |
| | | 28 | spring number three |
| 13 | USB connection | 29 | hand profile |
| 14 | Tablet section | | |
| 15 | user one's computer | | |
| 16 | user two's computer | | |
| 17 | internet connection | | |
| 18 | Bluetooth connection | | |
| 19 | Tablet software application | | |
| 20 | Tablet surface array button in a rest and middle position | | |
| 21 | Tablet surface button array encasement | | |
| 22 | top circuit board | | |
| 23 | bottom circuit board | | |
| 24 | switch | | |
| 25 | batteries | | |

DETAILED DESCRIPTION OF THE INVENTION

Figure 1:
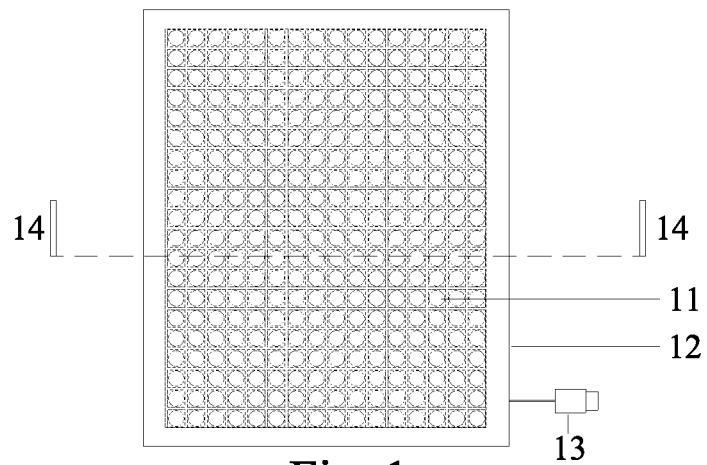
FIG. 1—top view of Unlimited Reach and Touch Tablet
Figure 2:
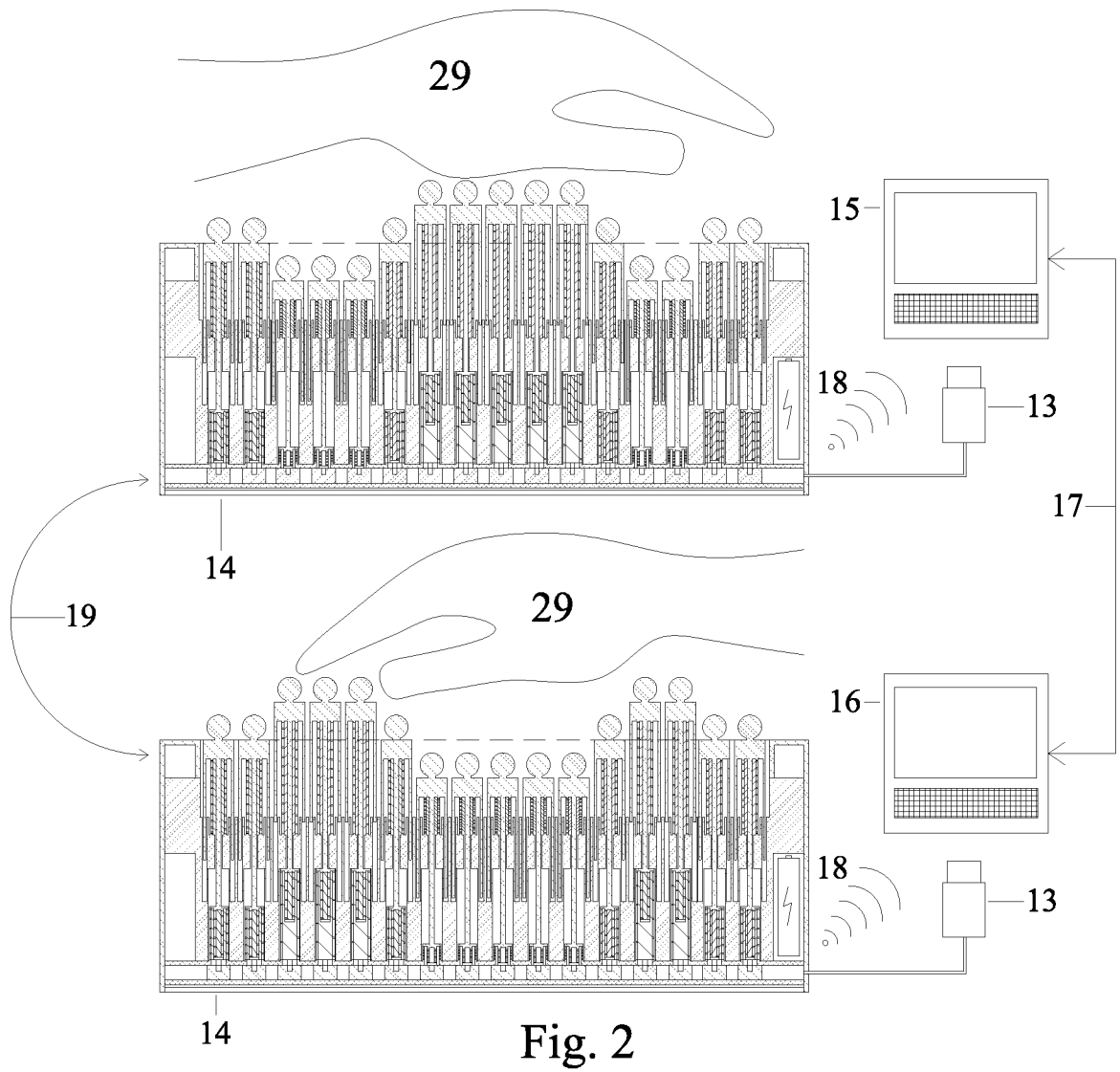
FIG. 2—Dynamic diagram of Unlimited Reach and Touch Tablet: user one and user two's Unlimited reach and touch tablets connected by computer application software and an internet connection allowing both users to receive and send, through reciprocal touching and pressing, movements of each other's button array displacement profiles.
Figure 3:
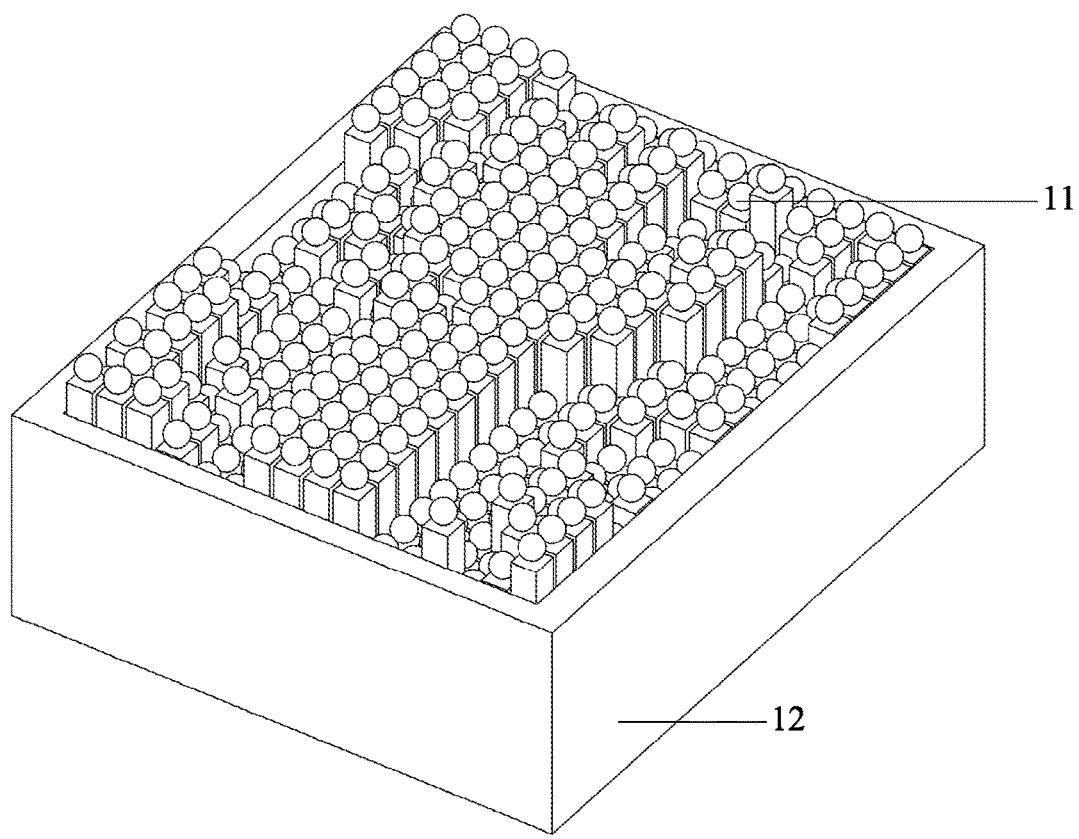
FIG. 3—Axonometric view of Unlimited Reach and Touch Tablet
Figure 4:
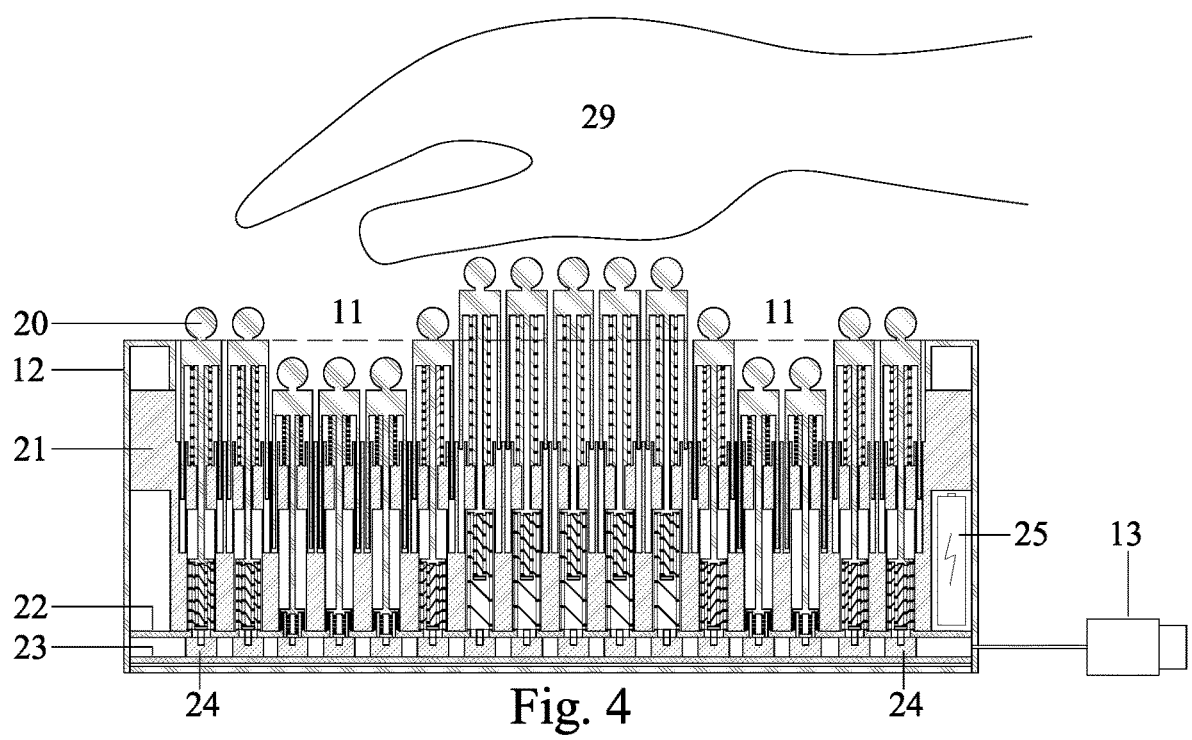
FIG. 4—Section
Figure 5:
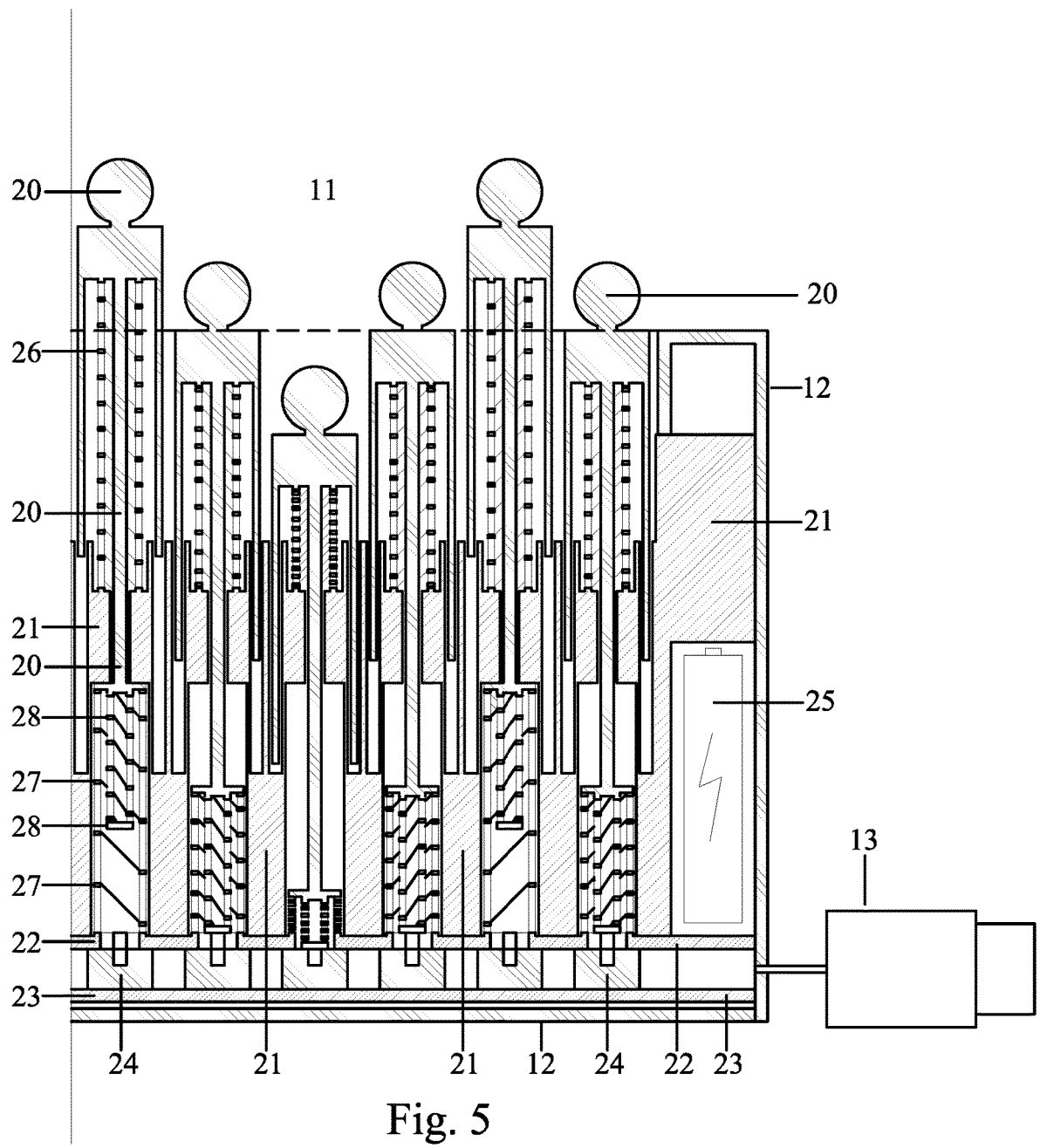
FIG. 5—Detail view
Figure 6:
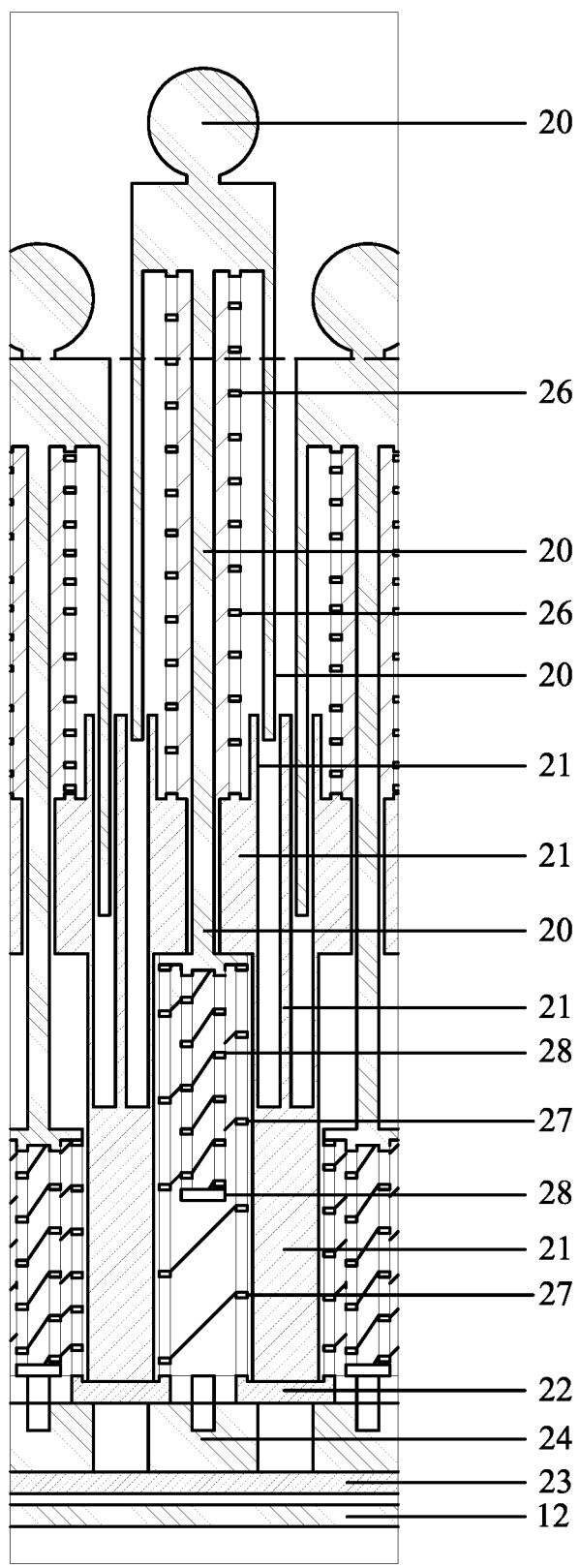
FIG. 6—Sectional detail view of individual button unit of Unlimited Reach and Touch Tablet button array.
Figure 7:
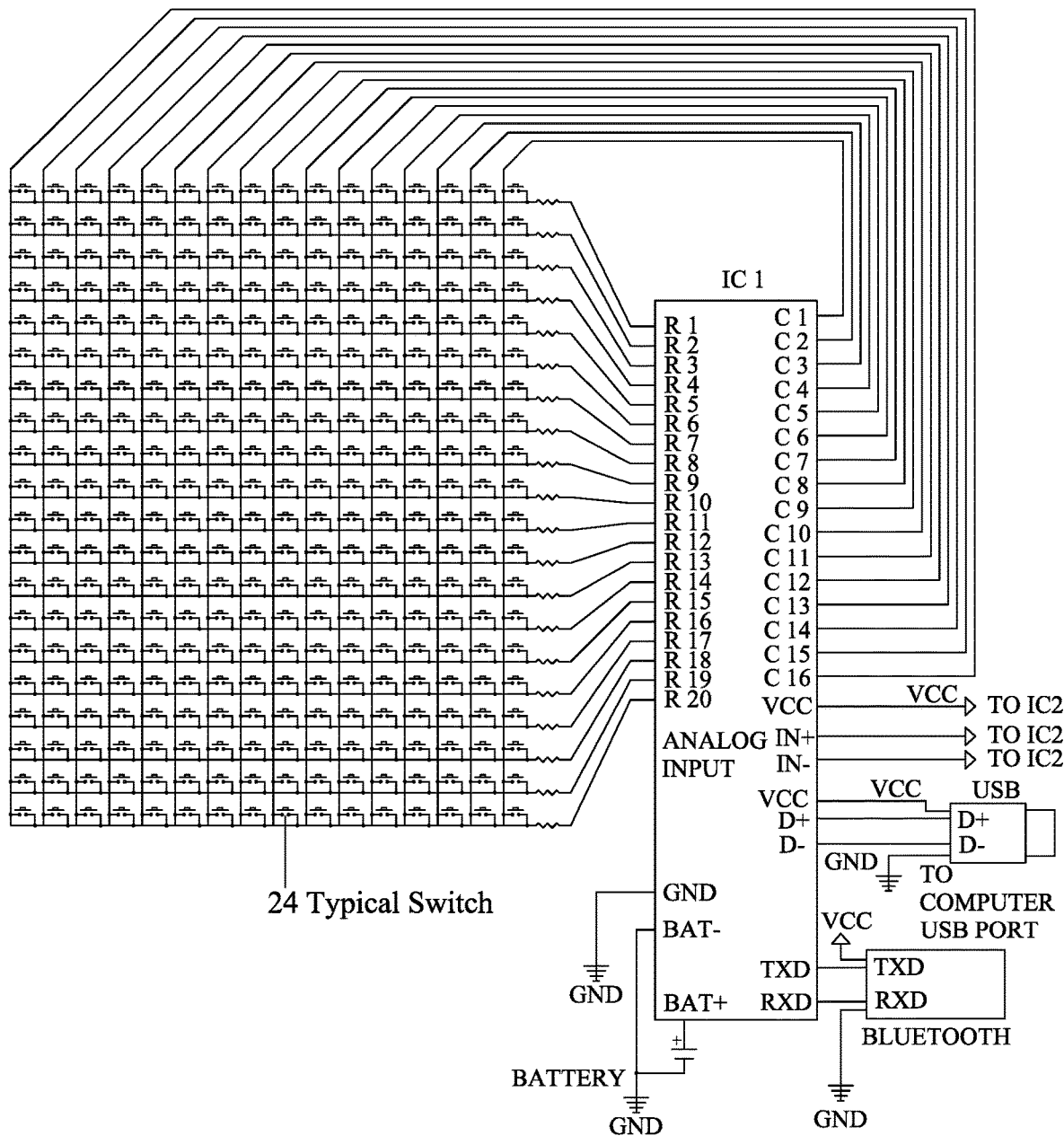
FIG. 7—Bottom circuit board used to send signals from a user's Tablet by pressing their hands into its button array thereby pressing switches which cause a rise in the remote user's Nitinol springs and attached buttons which are identical to the buttons pressed by sending user.
Figure 8:
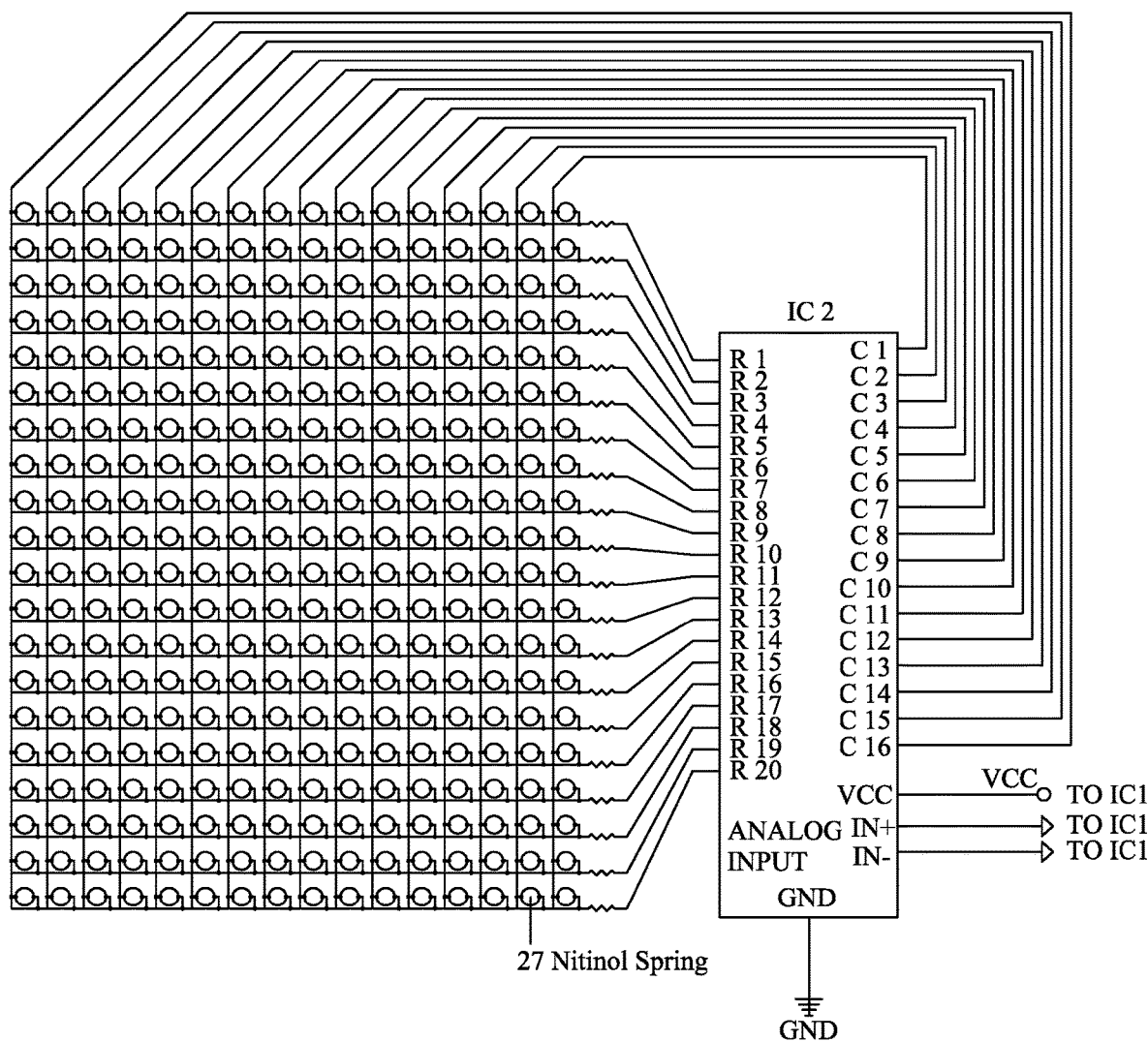
FIG. 8—Top circuit board used to receive signals from remote user's Tablet, causing a rise in the receivers' Nitinol springs and attached buttons.

The operation of an Unlimited Reach and Touch Tablet is made possible by two or more users with their respective Unlimited Reach and Touch Tablets that are, via USB 13 or Bluetooth 18, connected to computers with internet access 17 and a connecting software application for the Tablets' use FIG. 2.

The operational mechanism of said Tablet device is a surface array of uniform buttons 11; each button consisting of: three springs 26/27/28, two circuit board connections 22/23, and a switch 24 for each button 20 of the array. The switch 24 is used, by the user pressing their hands into the button array, to signal the expansion of a Nitinol spring 27 on the identical button of a remote users' Tablet.

Of the three springs, the first 26 is polymer based and it is made attached to the end of each button in the array [26]; and, when compressed, it signals a switch 24 on the bottom circuit board 23 and, using a computer with connecting software and internet connection, causes a rise and fall of an identical button in the remote users' Tablets' surface button array 11.

The second spring 27 is a shape memory alloy, Nitinol, that is connected to the top circuit board 22 which, when the remote users' Tablet's button and switch is pressed, carries a signal that activates the Nitinol springs expansion on the receiving Tablet by an electric current passing through the receiving Tablet's top circuit board 22. By activating the shape memory alloy spring, it causes it to expand and simultaneously create a rise in the receivers' Tablets' button array, thereby, mirroring the pressed button displacements of the senders Unlimited Reach and Touch Tablet.

The third of the three springs 28 is also made from a polymer and functions as a median keeper; i.e., keeping and returning the surface button array to a middle, neutral and at rest position.

The material and making of the Unlimited Reach and Touch Tablet is by 3d printing a polymer to form the button array, the buttons' encasement, and two of the three springs, 26 and 28, printed attached to the buttons 20.

Completing the device is the shape memory alloy, Nitinol, spring 27 for each button which are printed together with the top circuit board 22. The bottom circuit board 23 and switches 24, USB in/output 13 and Bluetooth device 18, and a plastic case 12 finish the Tablet. The power for the Tablet is either from USB connection 13 to the computer and, or batteries 25.

The invention claimed is:

1. An interactive computer peripheral tablet comprising:
   (a) a surface array of uniform buttons consisting of three springs, a switch, and two circuit boards;
   (b) a switch for each button of the array attached to a lower circuit board and used to signal the expansion of a Nitinol spring on an identical button of a remote users' Tablet;
   (c) a first polymer spring is made attached to the end of each button in the array and, when compressed, it signals a switch on a bottom circuit board and, using a computer with connecting software and internet connection, the switch causes the rise and fall of an identical button in a remote users' Tablets' surface button array;
   (d) a second spring is a shape memory alloy that is connected to a top circuit board by which, when the remote users' Tablet's switch is pressed, a signal activates the identical springs expansion by sending an electric current through a receiving Tablets' top circuit board activating the shape memory ahoy spring causing it to expand and simultaneously create a rise in the receivers' Tablets' button array mirroring the pressed button displacements of the senders' interactive computer peripheral tablet; and
   (e) a third polymer spring is made attached to each button functioning as a median keeper returning said surface button array to a middle, neutral and at rest position.

* * * * *

UNITED STATES PATENT AND TRADEMARK OFFICE
CERTIFICATE OF CORRECTION

PATENT NO. : 10,540,016 B1
APPLICATION NO. : 16/164575
DATED : January 21, 2020
INVENTOR(S) : Jeffrey Thomas Johnson Page 1 of 1

It is certified that error appears in the above-identified patent and that said Letters Patent is hereby corrected as shown below:

In the Claims

Column 4, Claim 1/section (d)/ Line 6 the word "ahoy" should read "alloy"

Signed and Sealed this
Twenty-seventh Day of August, 2024

Katherine Kelly Vidal
*Director of the United States Patent and Trademark Office*